Patented Sept. 15, 1931

1,823,605

UNITED STATES PATENT OFFICE

CHARLES P. HOOVER, OF COLUMBUS, OHIO

PROCESS OF SOFTENING WATER

No Drawing.    Application filed January 24, 1930. Serial No. 423,270.

This invention relates to a process for treating and purifying water, and is concerned more particularly with the treatment of hard water to soften the same.

An object of the invention is to reduce the carbonate hardness of water to approximately the solubility limit of the hardening compounds therein, which solubility limit is approximately the theoretical limit to which carbonate hardness can be reduced by a treatment involving lime softening.

The process comprises adding to the raw water sufficient lime $$[CaO \text{ or } Ca(OH)_2]$$

to combine with the free and half-bound carbon dioxide and to precipitate the magnesium compounds therein, neutralizing the excess lime by carbonation, and adding a finely divided material in the nature of water softening sludge; all of which is more fully hereinafter described and claimed.

When lime is added to hard water containing free carbonic acid, calcium bi-carbonate, magnesium bi-carbonate, sulfate, nitrate or chloride, theoretically the following reactions should take place:

1. $CO_2 + Ca(OH)_2 = CaCO_3 + H_2O$
2. $Ca(HCO_3)_2 + Ca(OH)_2 = 2CaCO_3 + 2H_2O$
3. $Mg(HCO_3)_2 + Ca(OH)_2 = MgCO_3 + CaCO_3 + 2H_2O$
4. $MgCO_3 + Ca(OH)_2 = Mg(OH)_2 + CaCO_3$
5. $MgSO_4 + Ca(OH)_2 = Mg(OH)_2 + CaSO_4$
6. $MgCl_2 + Ca(OH)_2 = Mg(OH)_2 + CaCl_2$
7. $Mg(NO_3)_2 + Ca(OH)_2 = Mg(OH)_2 + Ca(NO_3)_2$

Unfortunately, lime water softening reactions do not proceed in cold water or water at ordinary temperatures in an orderly fashion as represented by the equations. The precipitates of calcium carbonate and magnesium hydroxide are produced in a state or condition of very fine subdivision. Colloids or complexes of basic carbonates may be formed.

These compounds and colloidal precipitates in lime softened water causes the carbonate hardness to be higher than it should theoretically be and their removal has been a problem at lime water softening plants because they cannot be removed by ordinary settling and filtration processes. Until very recently a 50% average reduction of magnesium and an average reduction of carbonate hardness to 50 or 60 parts per million was considered as being as good as could be obtained. Many results running as high as 85 or 90 parts per million are recorded.

Chemical handbooks usually record the solubility of calcium carbonate as being 13 to 20 parts per million and magnesium hydroxide as being 1 part per million, or, in terms of calcium carbonate 1.7 parts per million. These figures therefore represent the theoretical limit to which carbonate hardness can be reduced by lime softening. That is, some place between 15 and 20 parts per million.

Neutralization of the causticity of lime-treated water has been accomplished by recabonation of the same with carbon dioxide gas.

The process or recarbonation requires very close supervision as the carbonate hardness is not reduced satisfactorily if the water is even slightly over or under carbonated. The precipitate of calcium carbonate resulting from the reaction between the excess lime $Ca(OH)_2$ and carbon-dioxide.

$$[Ca(OH)_2 + CO_2 = CaCO_3 + H_2O]$$

is in a very fine state of subdivision and 24 to 48 hours are required for it to settle and if filtered through sand filters has a tendency to clog them and shorten their time of service between washings.

The filtration of this water through sand filters has a bad effect on them because the calcium and magnesium compounds crystallize onto the surface of the sand grains, covering them with an adherent coating and causing them to grow in size and finally to lose their effectiveness as a filter medium. The sand grains not only grow in size, but they also cement themselves together, forming hard lumps in filters, and the water to be filtered will not pass through them. Once or twice a year it is necessary to spade up these filters and crush all hard lumps, and after seven or eight years of service the filter must be rebuilt.

In carrying out the process of the present invention, the carbonate hardness is reduced to or practically to the theoretical limit as follows:

(1) Use from 25 to 50 parts or more per million of lime in excess of that theoretically required to combine with the free and half-bound carbon-dioxide and to precipitate the magnesium.

(2) Settle out settleable precipitates (this is preferable but not essential.)

(3) Neutralize excess lime with carbon-dioxide gas.

(4) Mix with calcium carbonate or water softening sludge, approximately 1500 or more parts per million. This ratio may be decreased if desired.

(5) Settle.

(6) Filter.

I have indicated that partial settling is preferable after the treatment with excess lime and before neutralization with carbon dioxide. While it is desirable to do this, it is not essential, as carbonation may be done before any precipitates are removed.

Instead of using calcium carbonate or sludge produced from water softening reactions after the carbonation step, any inert finely divided material may be used. The return of sludge has been practiced in water softening, but has never been regarded of much value, because it is harmful rather than beneficial if water conditions are not right. For example, I have found that sludge addition at times has caused an increase in the carbonate hardness of water and other times has increased its causticity. I have found that sludge return after carbonation and neutralization or excess lime is of considerable value. The sludge not only accelerates precipitation of the finely divided suspension, but I have discovered that it acts as a correcting and stabilizing agent as well. This use of sludge after neutralization by carbonation not only eliminates the close supervision which was formerly necessary to provide for accurate carbonation, (to prevent under or overcarbonation) but also insures a satisfactory reduction of carbonate hardness of the water, so that uniform and desirable results can be obtained continuously. This correcting or stablizing action of the sludge after lime carbonation dispenses with the disadvantages attendant upon prior control and prior filtration difficulties. At the present time I am not prepared to state the theory of my novel discovery that sludge return stabilizes reduced carbonate hardness after neutralization has been accomplished by carbon-dioxide gas.

An example of my process is as follows:

A sample of Scioto river water having a carbonate hardness of 144 parts per million was mixed with 11 grains per gallon of quick lime and settled. The supernatant water showed the following results of analysis.

Alkalinity to methyl orange_____ 78
Alkalinity to phenolphthalein_____ 61
Excess lime or caustic alkalinity_____ 44

The sample was carbonated with carbon-dioxide gas and then analysed as follows:

Alkalinity to methyl orange_____ 60
Alkalinity to phenolphthalein_____ 31
Excess lime or caustic alkalinity_____ 2

Calcium carbonate was added 1500 parts per million of water, stirred for less than one-half minute, allowed to settle and was filtered through filter paper and analysed with the following result:

Alkalinity to methyl orange_____ 15
Alkalinity to phenolphthalein_____ 3
Excess lime or caustic alkalinity_____ 0

While I have indicated the reduction of carbonate hardness, the process is not limited to waters containing soluble carbonates only, as treatment with soda ash to remove hardness due to sulphates, chlorides and nitrates may be used in conjunction with my lime softening.

The invention is not limited to the particular embodiments herein described, but is intended to include such modifications thereof as fall within the scope of the appended claims.

By the term "lime," I also mean slaked lime.

I claim:

1. The process of softening hard water whereby the carbonate hardness is reduced to approximately the theoretical solubility limit of calcium carbonate and magnesium hydroxide which comprises treating the water with 25 to 50 or more parts per million of lime in excess of that theoretically required to combine with the free and half-bound carbon-dioxide and to precipitate the magnesium, permitting the mixture to settle, carbonating the supernatant water with carbon-dioxide gas, mixing therewith calcium carbonate in amount sufficient to accelerate precipitation, and separating the precipitate.

2. The process of softening hard water whereby the carbonate hardness is reduced to approximately the theoretical solubility limit of calcium carbonate and magnesium hydroxide which comprises treating the water with 25 to 50 or more parts per million of lime in excess of that theoretically required to combine with the free and half-bound carbon-dioxide and to precipitate the magnesium, carbonating with carbon-dioxide gas, mixing therewith calcium carbonate in amount sufficient to accelerate precipitation, and separating the precipitate.

In testimony whereof, I have hereunto set my hand.

CHARLES P. HOOVER.